US012234871B2

(12) United States Patent
Palmgren et al.

(10) Patent No.: US 12,234,871 B2
(45) Date of Patent: Feb. 25, 2025

(54) BRAKE PAD RETAINER SYSTEM, BRAKE PAD, AND VEHICLE

(71) Applicant: Volvo Truck Corporation, Gothenburg (SE)

(72) Inventors: Marcel Palmgren, Torslanda (SE); Owe Johansson, Veddige (SE); Kent Augustsson, Bollebygd (SE); Martin Petersson, Sävedalen (SE); Lars Svensson, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 382 days.

(21) Appl. No.: 17/799,042

(22) PCT Filed: Feb. 20, 2020

(86) PCT No.: PCT/EP2020/054535
§ 371 (c)(1),
(2) Date: Aug. 11, 2022

(87) PCT Pub. No.: WO2021/164877
PCT Pub. Date: Aug. 26, 2021

(65) Prior Publication Data
US 2023/0108312 A1    Apr. 6, 2023

(51) Int. Cl.
*F16D 65/097*     (2006.01)
*F16D 55/226*     (2006.01)
*F16D 65/00*      (2006.01)

(52) U.S. Cl.
CPC ........ *F16D 65/0978* (2013.01); *F16D 55/226* (2013.01)

(58) Field of Classification Search
CPC .................................................. F16D 65/0978
See application file for complete search history.

(56) References Cited

U.S. PATENT DOCUMENTS

| 5,251,727 A | 10/1993 | Loeffler et al. |
| 2016/0108979 A1* | 4/2016 | Falter .................. F16D 65/0978 |
| | | 188/73.38 |

(Continued)

FOREIGN PATENT DOCUMENTS

| CN | 103133568 A | 6/2013 |
| CN | 105604788 A | 5/2016 |

(Continued)

OTHER PUBLICATIONS

Intention to Grant for European Patent Application No. 20707587.0, mailed Oct. 17, 2023, 29 pages.

(Continued)

*Primary Examiner* — Melody M Burch
(74) *Attorney, Agent, or Firm* — Withrow & Terranova, PLLC

(57) ABSTRACT

A brake pad retainer system in a vehicle disc brake comprises a calliper bridge and a calliper housing supporting brake pads on either side of a rotary brake disc, wherein the system is arranged to hold one brake pad in position relative to the calliper bridge. The retainer system comprises a retainer bracket arranged parallel to the brake disc axis and extending across a back plate of the brake pad, and a retaining spring arranged along a radially outer portion of the back plate and extending between the retainer bracket and the back plate. The retainer bracket has an angled surface arranged in contact with a corresponding first angled surface on the retaining spring. The retaining spring has a second angled surface arranged in contact with a corresponding angled surface on the radially outer portion of the back plate. The disclosure also relates to a brake pad.

10 Claims, 7 Drawing Sheets

(56) References Cited

U.S. PATENT DOCUMENTS

| | | | |
|---|---|---|---|
| 2016/0273600 A1* | 9/2016 | Radhakrishnan | F16D 65/092 |
| 2017/0138425 A1 | 5/2017 | Schropp et al. | |
| 2017/0138426 A1 | 5/2017 | Schoenauer et al. | |
| 2018/0347648 A1 | 12/2018 | Knoop | |
| 2019/0017558 A1 | 1/2019 | Schwarz | |
| 2019/0056000 A1 | 2/2019 | Beyer et al. | |
| 2019/0271367 A1* | 9/2019 | Philpott | F16D 65/0075 |

FOREIGN PATENT DOCUMENTS

| | | | | |
|---|---|---|---|---|
| CN | 105840694 | A | 8/2016 | |
| CN | 106460975 | A | 2/2017 | |
| DE | 102011115304 | B3 * | 2/2013 | B60T 1/065 |
| DE | 102017113384 | A1 * | 12/2018 | |
| EP | 144323 | A1 * | 8/2004 | |
| WO | 02086344 | A1 | 10/2002 | |
| WO | WO-2009046818 | A1 * | 4/2009 | F16D 65/0978 |
| WO | 18192627 | A1 | 10/2018 | |

OTHER PUBLICATIONS

First Office Action for Chinese Patent Application No. 202080096333.2, mailed Jan. 12, 2024, 11 pages.

International Search Report and Written Opinion for International Patent Application No. PCT/EP2020/054535, mailed Oct. 15, 2020, 14 pages.

International Preliminary Report on Patentability for International Patent Application No. PCT/EP2020/054535, mailed Jun. 10, 2022, 15 pages.

\* cited by examiner

BRAKE PAD RETAINER SYSTEM, BRAKE PAD, AND VEHICLE

This application is a 35 USC 371 national phase filing of International Application No. PCT/EP2020/054535, filed Feb. 20, 2020, the disclosure of which is incorporated herein by reference in its entirety.

TECHNICAL FIELD

The present disclosure relates to a vehicle disc brake arrangement, in particular a brake pad retainer system for disc brakes, a brake pad for the disc brake, and a vehicle provided with such a brake pad retainer system arrangement.

BACKGROUND

Vehicle brake systems are commonly provided with disc brakes, wherein a brake caliper is acted on by an actuator, such as a pneumatic or hydraulic cylinder, to displace a pair of brake pads into contact with a rotating brake disc. An inner brake pad is usually attached to the front of the actuator. However, the outboard, or outer brake pad in known disc brake calipers is free floating relative to the caliper and will slide towards the brake disc during brake application. A problem with this arrangement is that the outer brake pad may not return to its original position after a brake actuation, which can cause generation of noise and heat as well as premature wear of the brake pad. This type of losses generated by insufficient clearance between the brake pad and the brake disc is often referred to as parasitic drag.

A solution to this problem is indicated in WO18192627, which discloses a brake pad retainer system for holding a brake pad in position relative to a carrier. A spring biased bracket is arranged perpendicular to a plane of the brake pad, which bracket is arranged to press the brake pad into the calliper to move the brake pad away from the disc when the disc brake is not in use. A problem with this and similar solutions is that the function relies on one or more separate sheet metal springs for securing and spreading the brake pads. Such sheet metal springs are prone to wear and may cause rattling and parasitic drag even when correctly mounted.

US2016/0108979A1 discloses a caliper disc brake of a vehicle comprising a brake disc, a brake caliper, a brake support plate, a force transmission element, a pad support, a holding down spring for holding down the force transmission element, and a holding-down device.

WO02/086344A1 discloses a disc brake pad comprising a plate having opposite faces and an edge.

The object of the invention is to provide an improved calliper disc brake with a brake pad retainer system that solves the above problems.

SUMMARY

In the subsequent text, the terms "inboard" and "outboard" are intended to describe the relative locations of component parts or surfaces along a transverse vehicle wheel axle, in relation a central longitudinal axis of the vehicle. Alternative relative terms such as "inner" and "outer" can also be used for this purpose. The terms "axial direction" and "radial direction" describe directions relative to the rotational axis of a brake disc in a disc brake arrangement, unless otherwise specified. In the subsequent text, the calliper disc brake is described using terms for different parts thereof. In this context it may be noted that the calliper can be assembled from individual components such as a calliper housing and a calliper bridge. Alternatively, the calliper can have a monobloc design. The disclosure outlined below is applicable to any type of calliper disc brake design.

The disclosure relates to a brake pad retainer system, in particular for a vehicle floating calliper disc brake. A calliper disc brake comprises a brake disc connected to a vehicle wheel, which brake disc has inboard and outboard side surfaces and a central rotational axis. The calliper disc brake comprises a calliper housing and a calliper bridge, making up a calliper. The calliper has facing first and second side walls on opposite sides of the brake disc, where the first side wall has at least one actuator mounted in a cavity in the calliper housing. A suitable actuator is preferably a piston-cylinder arrangement actuated by a suitable fluid or an electric actuator. The subsequent text describes an arrangement with a fluid actuator. The second side wall is part of a calliper bridge extending from the calliper housing and the first wall and is arranged spanning the brake disc. A first brake pad is mounted to or adjacent the at least one piston in the calliper housing on the calliper piston side and is arranged to contact the inboard side of the brake disc during braking. A second brake pad is mounted to the second wall on the calliper bridge side and is arranged to contact the outboard side of the brake disc during braking. The brake pads comprise a brake lining arranged for frictional contact with the brake disc. The brake lining is fixed to a support such as a back plate which is arranged to be mounted to the disc brake.

According to one aspect, the disclosure relates to a brake pad retainer system in a vehicle disc brake comprising a calliper supporting brake pads on either side of a rotary brake disc. The retainer system described below is arranged to hold a brake pad in position relative to a calliper bridge. In this example, the retainer system is provided for an outboard brake pad mounted to the second wall on the calliper bridge side. The retainer system comprises a retainer bracket arranged parallel to the brake disc axis and extending across a back plate of the brake pad, and a retaining spring arranged along a radially outer portion of the back plate and extending between the retainer bracket and the back plate. The retainer bracket has an angled surface arranged in contact with a corresponding angled surface on the retaining spring. Further, the retaining spring has an angled surface arranged in contact with a corresponding angled surface on the radially outer portion of the back plate. Consequently, when the brake pad has been positioned in the calliper bridge and the retaining spring has been attached to the radially outer portion of the back plate of the brake pad, the retainer bracket is fastened to the calliper across the brake disc and the inboard and outboard brake pads. The angled surface of the retainer bracket will act on the angled surface on the retaining spring, which in turn acts on the angled surface on the radially outer portion of the back plate. Any movement or vibration of the brake pad is counteracted by the retaining spring, which prevents rattling during operation of the disc brake.

The angled surfaces of the retainer bracket, the retaining spring and the retainer bracket are arranged angled relative to a plane parallel to the brake disc rotary axis, which angle is converging towards the brake disc and its rotary axis. When the retainer bracket is being mounted it will apply a force to the retaining spring and the brake pad. The angled surfaces between the retainer bracket and the retaining spring will split the force applied by the retainer bracket into an axial component and a radial component. The radial component will apply a radial force to the retaining spring and the brake pad back plate in order to maintain the brake pad back plate in contact with radial support surfaces at the radially inner portion of the brake pad back plate. The axial component will apply an axial force to the retaining spring and the brake pad back plate in order to maintain a rear surface of the brake pad back plate in contact with the second wall on the calliper bridge side. This arrangement causes the outboard brake pad to be held in contact with the second wall on the calliper bridge side of the calliper during actuation and release of the brake. This arrangement assists the spreading function for the brake pads when the brakes are released and avoids the risk of parasitic drag.

The angled surfaces of the radially outer portion of the back plate, the retaining spring and the retainer bracket are preferably, but not necessarily, arranged at the same angle. This angle can be selected dependent on a number of factors, such as the size of the brake pad, the calliper design and/or other interacting components, expected forces the disc brake may be subjected to, the type of vehicle used, etc. In general, a suitable interval can between 1° and 10°. Larger angles are possible and will produce a more pronounced retaining force but may cause a tilting of the retaining spring under certain circumstances. Similarly, a relatively small angle will produce a lower retaining force, while reducing the risk of causing a tilting of the retaining spring. Hence, the choice of an ideal angle can be a design choice. In the case of a standard truck the angle can be selected between 1° and 10°, alternatively between 2° and 8° preferably about 3°. The angled surface on the respective component preferably comprises a flat surface. For the retaining spring and the outer portion of the back plate, a radial cross-section through the respective flat surface would form a chord. Other shapes are possible for the angled surfaces, such as a curved, partially conical surface following the radius of the back plate, but in order to achieve an even force distribution between the component parts and avoid point or line contact a flat surface is preferred.

Each end of the retaining spring is mounted into a groove or slot in the radially outer portion of the back plate. Usually, the retaining spring is snapped into position and provides a spring force when a radial load is applied to the assembled retaining spring and brake pad, for instance by the retainer bracket as described above. This arrangement locates the retaining spring in the circumferential direction of the back plate. In order to prevent movement in the axial direction, the retaining spring has a first and a second opening along its longitudinal extension. The first and second openings allow the retaining spring to be mounted on corresponding first and second projections extending from the radially outer portion of the back plate.

The retaining spring and the back plate can further comprise cooperating locating means to orientate the retaining spring relative to the back plate. Such an arrangement will facilitate mounting of the spring, as it prevents the retaining spring from being mounted incorrectly.

According to a first example, the locating means comprises different widths of the first and the second openings in the retaining spring and corresponding different thicknesses of the first and second projections on the back plate. For instance, the first and second openings can have different axial and/or circumferential dimensions, which openings will match corresponding, different sized first and second projections on the back plate.

According to a second example, the locating means comprises an asymmetric location of the first and the second openings and the first and second projections along the radially outer portion of the back plate. In this example, the first and second openings will match corresponding first and second projections which are offset in the circumferential direction of the back plate relative to a plane at right angles to a radial centre line of the back plate.

According to a third example, the locating means comprises a combination wide and narrow slots positioned along the retaining spring arranged to cooperate with matching projections on the radially outer portion of the back plate. For instance, the first and second openings can be supplemented by at least one further opening having a predetermined shape or being arranged at a predetermined angle relative to the longitudinal extension of the retaining spring. The further opening will match a corresponding further projection extending radially out of the back plate.

According to a second aspect, the disclosure relates to a brake pad for a vehicle disc brake. The brake pad comprises a back plate having a front surface and a rear surface, wherein the front surface is arranged to face a brake disc and the rear surface is arranged to face the side wall of the calliper bridge when the brake pad is mounted. A friction lining is attached to the front surface of the back plate, and circumferentially spaced first and second projections extend in the radial direction from a radially outer portion of the back plate.

The radially outer portion has an angled surface located between the first and second projections. The length of the angled surface outer portion of the back plate can be dependent of the design of the retainer system for holding the brake pad in position. The length of the angled surface is greater than the width of a retainer bracket extending in an axial direction across the brake pad. The angled surface is arranged at an acute angle relative to a plane at right angles to a radial centre line of the back plate and converging with the rotary axis of a brake disc in the direction of the friction lining. The angled surface is a bevelled surface extending from the outer periphery of the rear surface and radially inwards into the front surface of the back plate. In this way, a plane coinciding with the angled surface will converge with the rotary axis of a brake disc in the direction of the brake disc when the brake pad is mounted in a disc brake. The acute angle is preferably selected between 1° and 10°, alternatively between 2° and 8° preferably about 3° . . . . The angled surface is preferably a flat surface.

According to a third aspect, the disclosure relates to a vehicle comprising a brake pad retainer system as described above.

An advantage of a brake pad retainer system as described above is that it will automatically return the outer brake pad to its original position after a brake actuation, which ensures that generation of noise and heat is avoided. The arrangement will always provide sufficient clearance between the brake pad and the brake disc in order to prevent parasitic drag. In addition, the use of sheet metal springs for mounting the brake pad can eliminate rattling and vibration induced noise.

BRIEF DESCRIPTION OF THE DRAWINGS

In the following text, the invention will be described in detail with reference to the attached drawings. These schematic drawings are used for illustration only and do not in any way limit the scope of the invention. In the drawings.

DETAILED DESCRIPTION OF EXAMPLE EMBODIMENTS OF THE INVENTION

Figure 1:
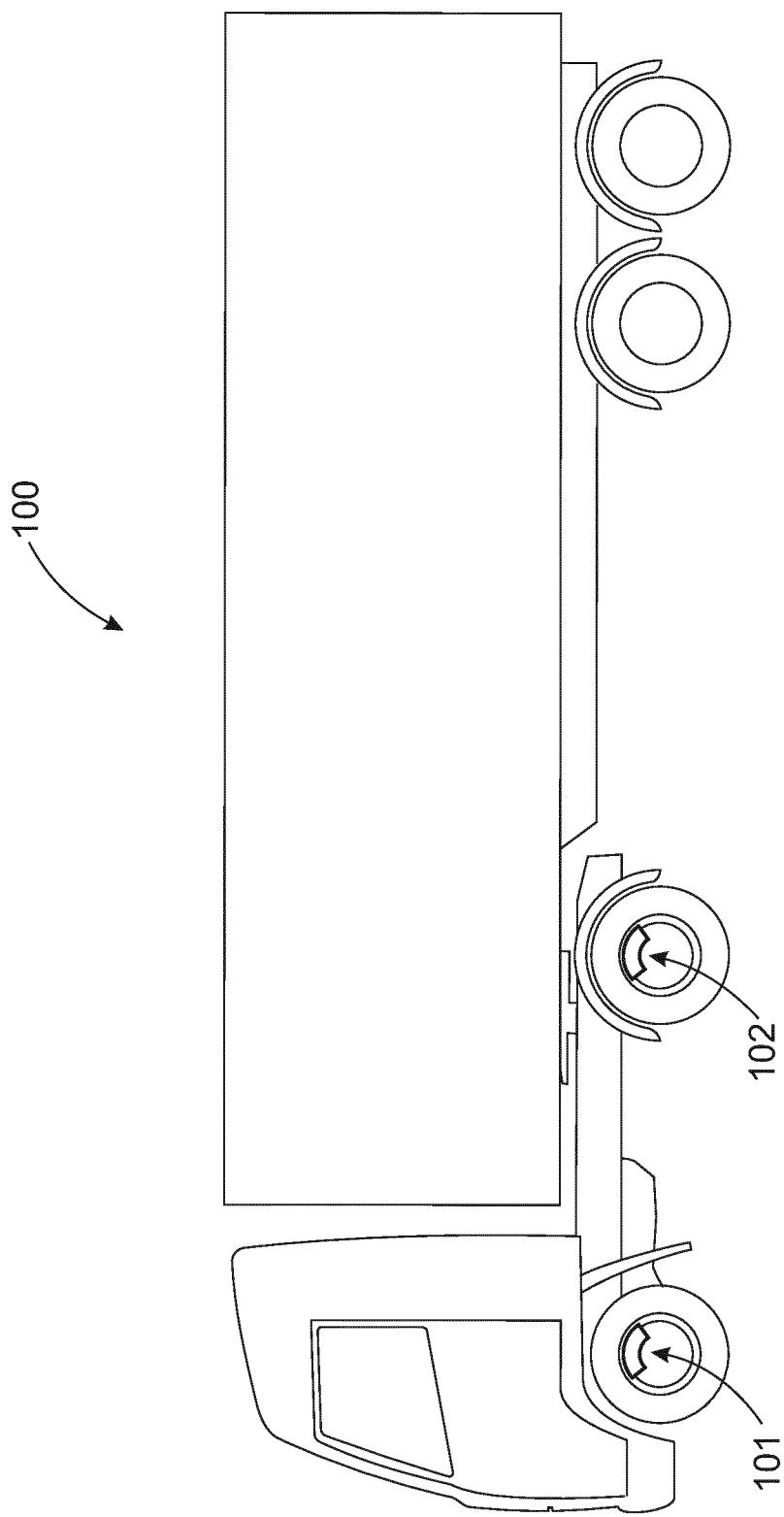
FIG. 1 shows a schematically indicated vehicle with a calliper disc brake arrangement

FIG. 1 shows a schematically indicated vehicle 100 provided with disc brake arrangements 101, 102 according to the present teaching. Such a disc brake arrangement will be described in detail in connection with FIGS. 2 to 7 below.

Figure 2:
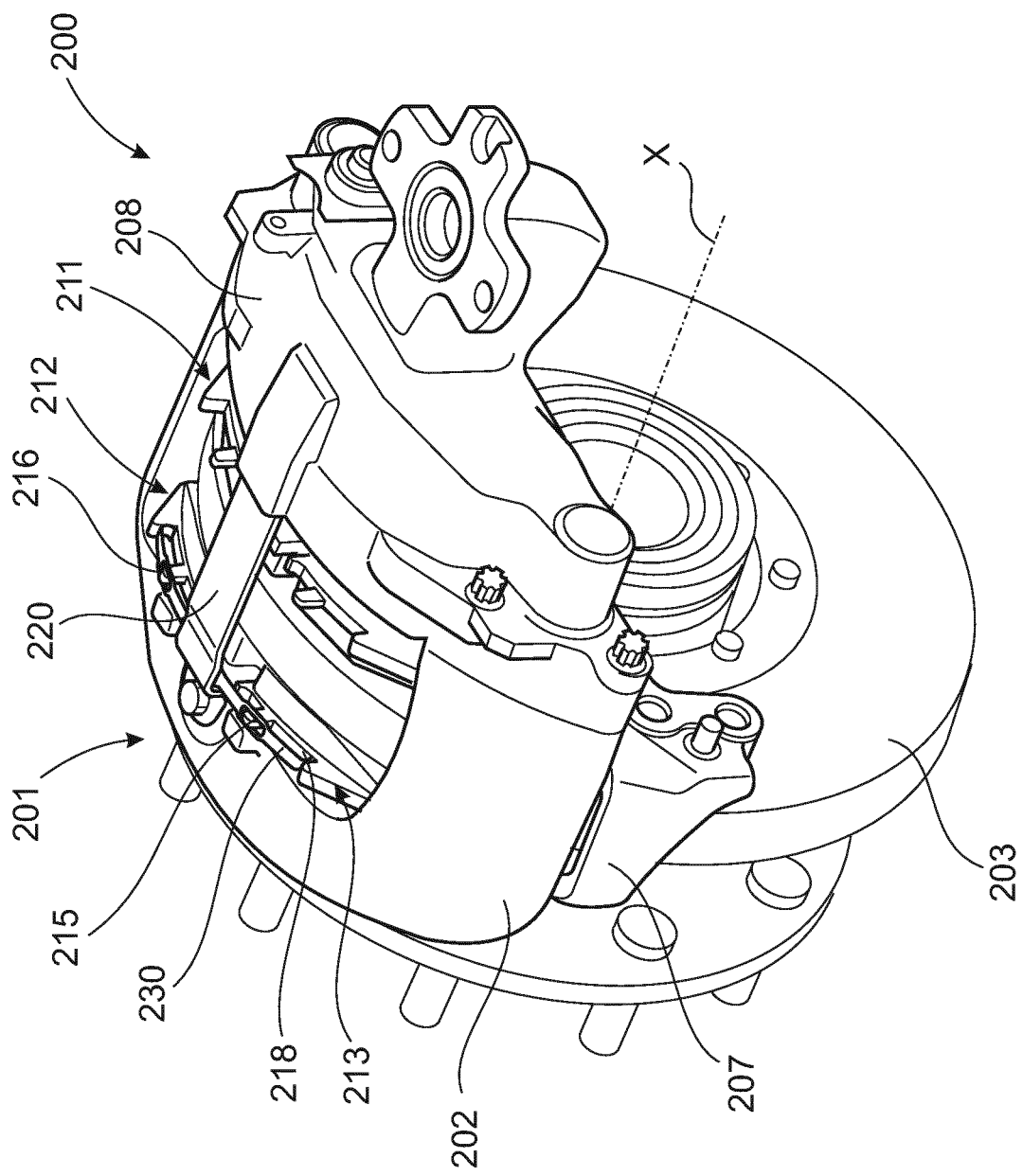
FIG. 2 shows a perspective view of a calliper disc brake with a brake pad retaining system.

FIG. 2 shows a perspective view of a calliper disc brake 200 with a brake pad retaining system 201. The calliper disc brake 200 comprising a carrier 207, a calliper housing 208 and a calliper bridge 202. The calliper housing 208 and the calliper bridge 202 forms a calliper 202, 208. A brake disc 203 with a rotational axis X is connected to a vehicle wheel (not shown). An actuator (not shown) is arranged in the calliper housing 208 to displace a piston in order to actuate the disc brake. The actuator is usually a fluid actuator connected to a source of hydraulic or pneumatic pressure, but an electric actuator can also be employed. The calliper 202, 208 has facing first and second side walls on opposite sides of the brake disc 203, where the first side wall has a piston slidably mounted in a cavity. The second side wall is part of the calliper bridge 202. The calliper 202, 208 is arranged to span across the brake disc 203. The carrier 207 is connected with the vehicle (not shown) and has a first leading and a second trailing reaction arms, each reaction arm projecting through an aperture (not shown) of the calliper housing 208. Two pin means are provided to slidably mount the first wall of the calliper with the carrier 207 along an axis parallel with the rotational axis X of the brake disc 203. When the piston is actuated and displaced out of the first wall a first brake pad 211 will come into contact with the brake disc 203, causing an initial displacement of the calliper housing 208 and the calliper bridge 202 to the right in FIG. 2. This displacement causes a second brake pad 212 to come into contact with the brake disc 203. The effect of this displacement is to cause a simultaneous displacement of the first and second brake pads 211, 212 into frictional engagement with the brake disc 203. Continued actuation of the piston will cause a braking action as both brake pads come into frictional engagement with the brake disc 203.

A brake pad retainer system 201 is provided in the calliper bridge 202 for supporting the outboard second brake pad 212 of the disc brake 200. The retainer system comprises a retainer bracket 220 and a retaining spring 230 which interact with the outboard brake pad 212 to hold it in position. The retainer bracket 220 is arranged parallel to the brake disc axis X and extends across a back plate 213 of the brake pad 212. The retaining spring 230 is arranged along a radially outer portion 218 of the back plate 213 and extends between the retainer bracket 220 and the back plate 213. The retainer bracket 220 has an angled surface 221 arranged in contact with a corresponding first angled surface 232 (see FIG. 5) on an upper surface of an angled portion 231 (see FIG. 6) of the retaining spring 230. The retaining spring 230 has a second angled surface 233 on a lower surface of the angled portion 231, which second angled surface 233 is arranged in contact with a corresponding angled surface 219 on the radially outer portion 218 of the back plate 213 (see FIG. 5). The retaining spring 230 is located by a first and a second projection 215, 216 extending from the radially outer portion 218 of the back plate 213.

Figure 3:
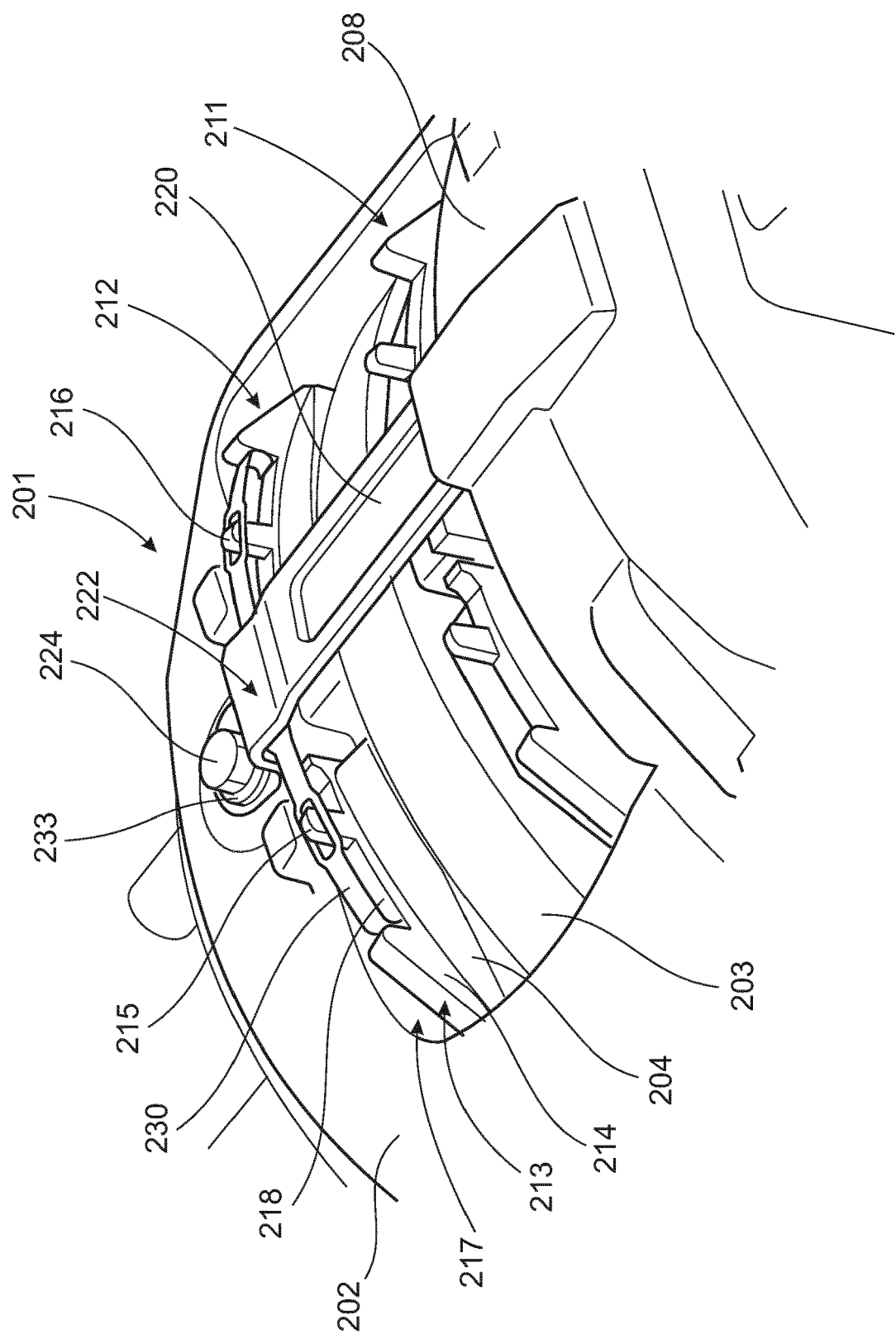
FIG. 3 shows an enlarged view of the calliper disc brake in FIG. 2.

FIG. 3 shows an enlarged view of the brake pad retainer system 201 on the calliper disc brake in FIG. 2. FIG. 3 shows a perspective view of the outboard brake pad 212 comprising the back plate 213 and a friction lining 204 fixed to a front surface 214 of the back plate 213. The retainer bracket 220 is mounted to the calliper housing 208 at one end (see FIG. 4) and extends over the first and second brake pads 211, 212 and the brake disc 203. A second end 223 of the retainer bracket 220 has an attachment portion is fixed to the calliper bridge 202 by a fastener 224, which in this case is a threaded bolt. Adjacent its second end 223 and above the second brake pad 212, the retainer bracket 220 has a bent portion 222. The bent portion 222 is angled upwards relative to the main plane of the retainer bracket 220 in the direction away from the brake disc. This angled bent portion 222 provides the angled surface 221 on the side of the retainer bracket 220 facing the retaining spring 230.

Figure 4:
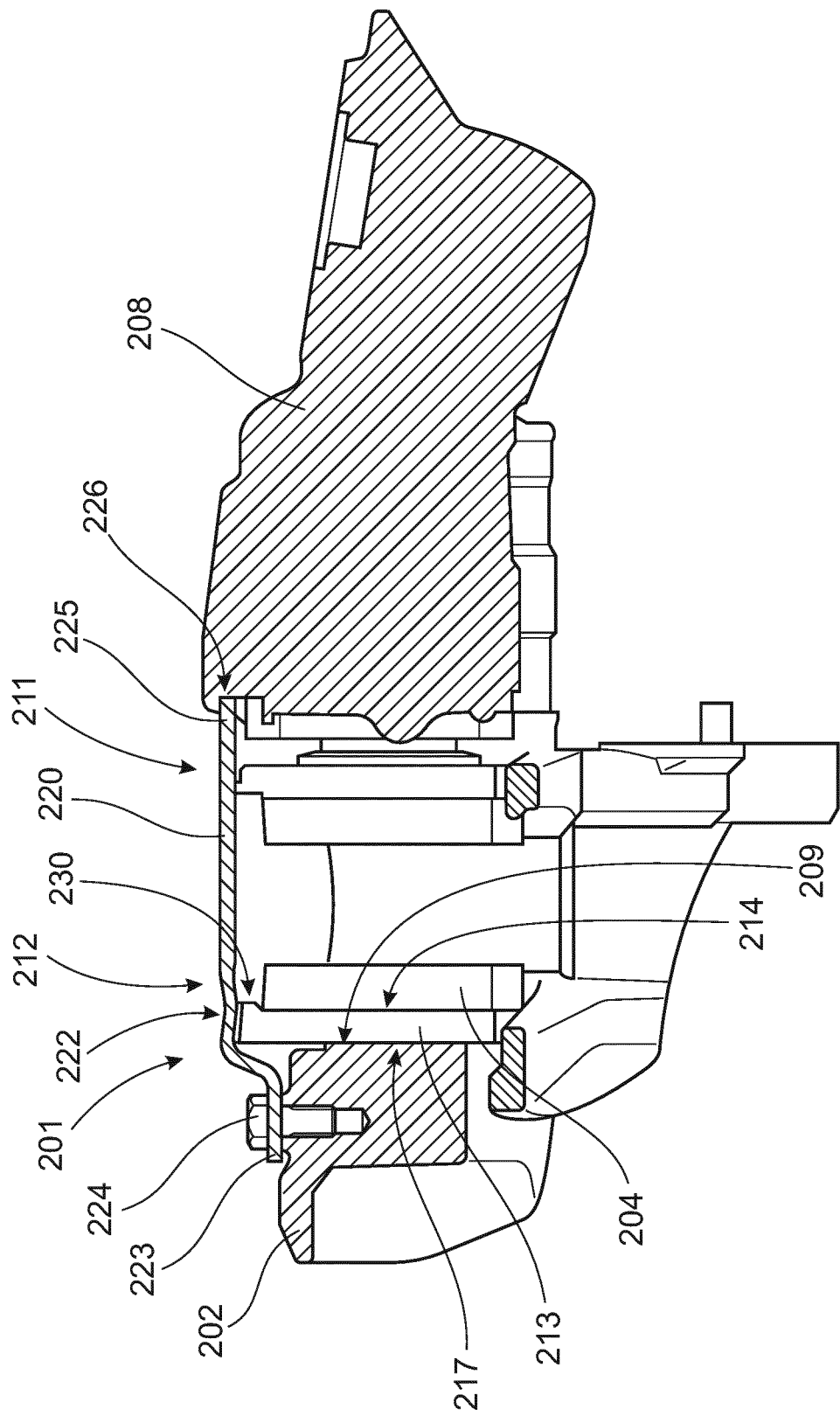
FIG. 4 shows a cross-section in an axial plane of the calliper disc brake in FIG. 2.

FIG. 4 shows a cross-section in a vertical axial plane of the calliper disc brake in FIG. 2. FIG. 4 shows a first end 225 of the retainer bracket 220 mounted in a recess 226 in the calliper housing 208. The retainer bracket 220 extends over the first and second brake pads 211, 212 and its second end 223 has an attachment portion fixed to the calliper bridge 202 by the fastener 224. The bent portion 222 adjacent the second end 223 of the retainer bracket 220 interacts with the retaining spring 230 to hold the second brake pad 212 in place. FIG. 4 further shows that the calliper bridge 202 comprises a supporting side wall 209, referred to as a second side wall above, for a rear surface 217 of the back plate 213. As described above, a friction lining 204 is fixed to the front surface 214 of the back plate 213. Radially inner portions of the back plate 213 are supported by additional support surfaces (not shown), allowing the brake pad 212 to be held in position by the retainer bracket 220 and the retaining spring 230.

Figure 5:
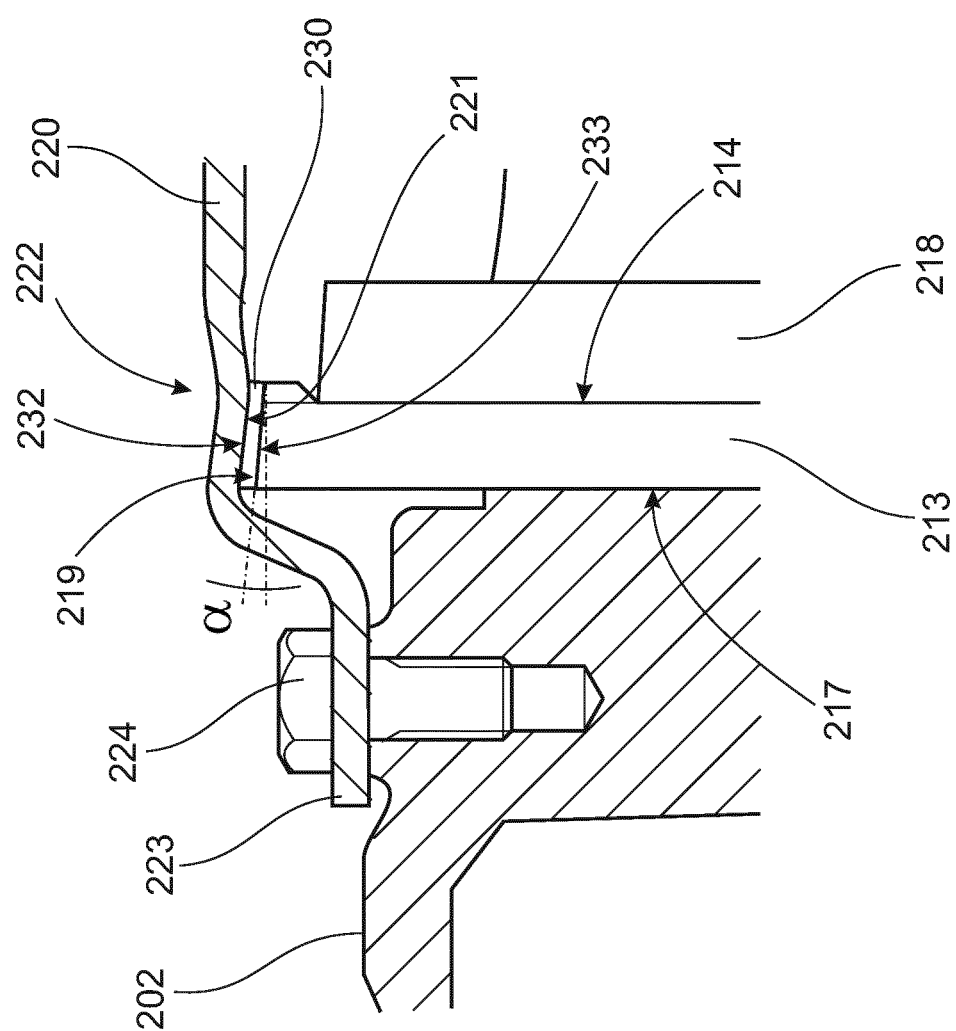
FIG. 5 shows an enlarged view of the cross-section in FIG. 4.

FIG. 5 shows an enlarged view of the cross-section in FIG. 4. FIG. 5 shows the bent portion 222 adjacent the second end the retainer bracket 220, which bent portion 222 has its lower angled surface 221 in contact with a corresponding first angled surface 232 on the upper surface of the retaining spring 230. The lower surface of the retaining spring 230 has a second angled surface 233 arranged in contact with a corresponding angled surface 219 on the radially outer portion 218 of the back plate 213. The angled surface 219 on the back plate 213 is a bevelled surface extending from the outer periphery of the rear surface 217 of the back plate 213 and into its front surface 214. In FIG. 5, the retainer bracket 220, the retaining spring 230 and the back plate 213 are shown in contact with each other. However, a tolerance of up to 1-2 mm can be allowed, so that the retaining spring 230 may not always be in contact with the angled surface 219 of the back plate 213. Nevertheless, the retaining force provided by the retainer bracket 220 via its angled surface 221 will always be transferred to the brake pad 212 via the retaining spring 230. In the example shown, the angled surfaces 219, 221, 232, 233 are all arranged at an acute angle α relative to a plane at right angles to a radial centre line $C_L$ of the back plate 213 (see FIG. 6) and parallel to the brake disc rotary axis X (see FIG. 2). The angle α is converging with the rotary axis X of the brake disc 203 in the direction of the brake disc. The choice of an ideal angle is dependent on a number of factors, such as the size of the brake pad, the calliper design and/or other interacting components, expected forces the disc brake may be subjected to, the type of vehicle used, etc. The angle can be selected between 1° and 10°, alternatively between 2° and 8°. Larger angles are possible and will produce a more pronounced retaining force but may cause a tilting of the retaining spring under certain circumstances. Similarly, a relatively small angle will produce a lower retaining force, while reducing the risk of causing a tilting of the retaining spring. In this example the angle α is selected at 3°.

Figure 6:
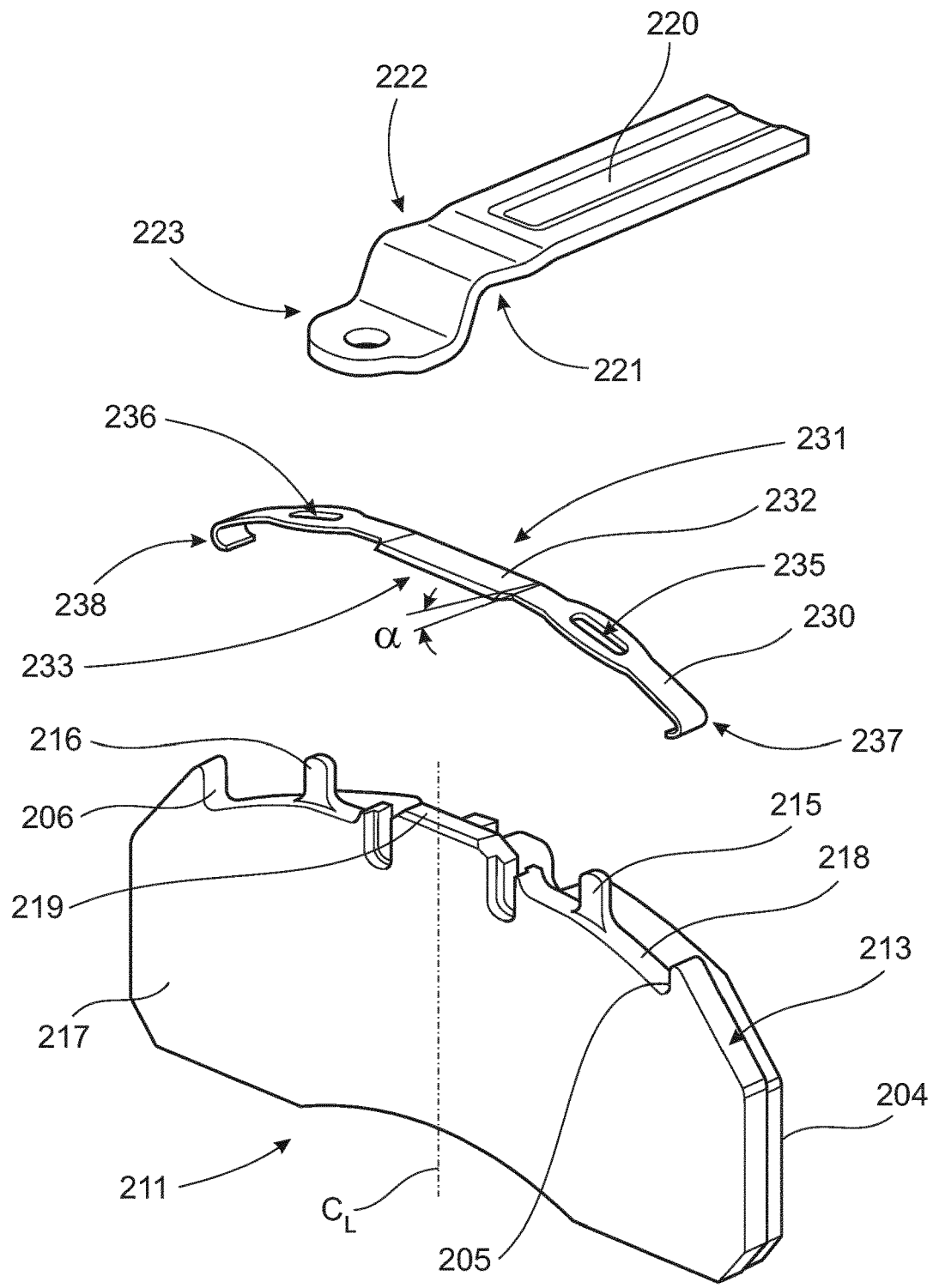
FIG. 6 shows an exploded view of a retaining system indicate in FIG. 5.

FIG. 6 shows an exploded view of a retaining system indicate in FIG. 5. FIG. 6 shows the retaining spring 230 comprising a leaf spring with a central angled portion 231. The central angled portion 231 has an upper first angled surface 232 and a lower angled surface 233. The elongate retaining spring 230 has a first and a second end 237, 238 each having a J- or hook shaped cross-section. The first and second ends 237, 238 of the retaining spring 230 are mounted into a respective slot 205, 206 in the radially outer portion 218 of the back plate 213. The retaining spring 230 is snapped into position and provides a spring force when a radial load is applied to the assembled retaining spring 230 and brake pad 212 by the retainer bracket 220 as described above. This arrangement of cooperating hooked ends 237, 238 and slots 205, 206 locates the retaining spring 230 in the circumferential direction of the back plate 213. In order to prevent movement in the axial direction of the brake pad 212, the retaining spring 230 has a first and a second opening 235, 236 along its longitudinal extension. The openings 235, 236 are located symmetrically on either side of the central angled portion 231, between the central angled portion 231 and the respective first and second ends 237, 238. The first and second openings 235, 236 allow the retaining spring 230 to be mounted on a pair of corresponding first and second projections 251, 216 extending in the radial direction from the radially outer portion 218 of the back plate 213.

The angled surfaces 219, 221, 232, 233 on the back plate 213, retainer bracket 220 and the retaining spring 230, respectively, are preferably flat surfaces. In order to ensure a desired surface contact, the width of the central angled portion 231 in the longitudinal direction of the retaining spring 230 should be greater than both the width of the angled surface 221 on the bent portion 222 of the retainer bracket 220 and the width of the angled surface 219 along the radially outer portion 218 of the back plate 213. In this way it is possible to avoid line or point contact between the component parts, which could cause wear and undesirable force concentrations on the contacting surfaces.

Figure 7:
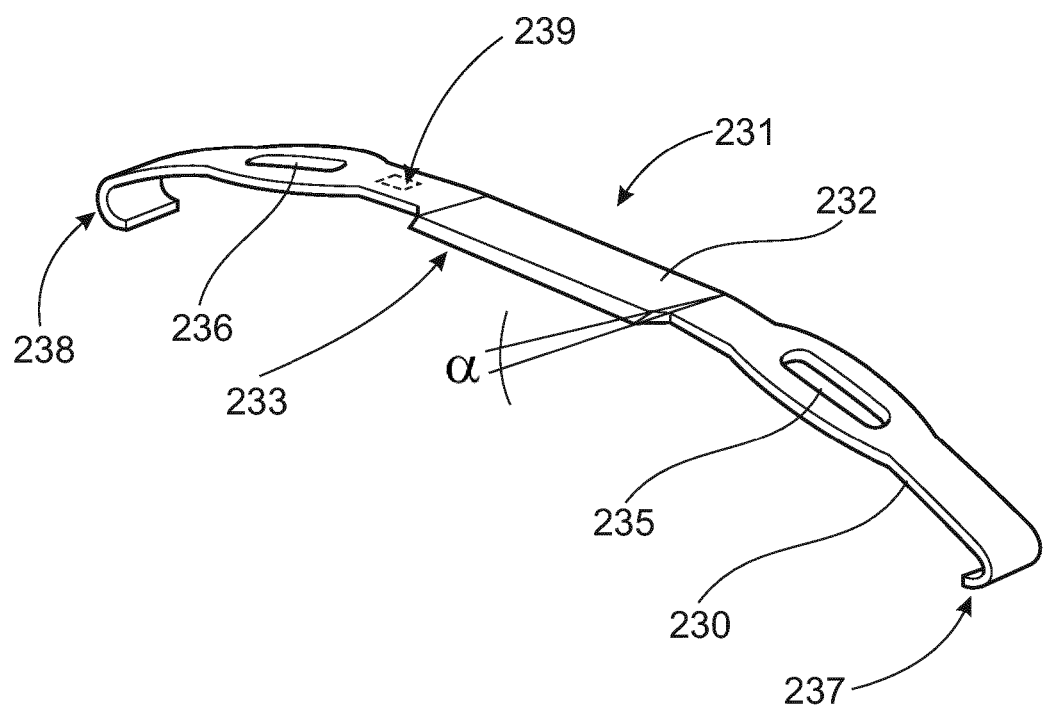
FIG. 7 shows an enlarged view of a retaining spring for a brake pad retaining system.

FIG. 7 shows an enlarged view of the retaining spring 230 in FIG. 6. When assembling the retaining system described above, the retaining spring 230 must be assembled onto the brake pad 212 so that the central angled portion 231 is positioned correctly relative to the angled surface 219 of the back plate 213. The retaining spring and the back plate can therefore be provided with an optional cooperating locating means to orientate the retaining spring relative to the back plate. Such a locating means will facilitate mounting of the retaining spring 230, as it can prevent the retaining spring from being mounted incorrectly According to a first example, the locating means comprises different widths of the first and the second openings 235, 236 in the retaining spring 230 and corresponding different thicknesses of the first and second projections 215, 216 on the back plate 213. For instance, the first and second openings can have different axial and/or circumferential dimensions, which openings will match corresponding, different sized first and second projections on the back plate.

According to a further example, the locating means comprises an asymmetric location of the first and the second openings 235, 236 and the first and second projections 215, 216 along the radially outer portion of the back plate 213. In this example, the first and second openings will match corresponding first and second projections which are offset in the circumferential direction of the back plate relative to a plane at right angles to the radial centre line $C_L$ (see FIG. 6) of the back plate 213.

An alternative optional locating means 239 is schematically indicated in FIG. 7. According to this example, the locating means 239 comprises a combination wide and narrow slots positioned along the retaining spring arranged to cooperate with matching projections on the radially outer portion of the back plate. For instance, the first and second openings 235, 236 can be supplemented by at least one further opening having a predetermined shape or being arranged at a predetermined angle relative to the longitudinal extension of the retaining spring. The further opening will match a corresponding further projection extending radially out of the back plate.

The present disclosure should not be deemed to be limited to the embodiments described above, but rather a number of further variants and modifications are conceivable within the scope of the following patent claims.

The invention claimed is:

1. A brake pad retainer system for a vehicle disc brake comprising a calliper bridge and a calliper housing supporting brake pads on either side of a rotary brake disc, wherein the system is arranged to hold one brake pad in position relative to the calliper bridge, the retainer system comprising:
   a retainer bracket arranged parallel to the brake disc axis and extending across a back plate of the brake pad, and
   a retaining spring arranged along a radially outer portion of the back plate and extending between the retainer bracket and the back plate;
   wherein the retainer bracket has an angled surface arranged in contact with a corresponding first angled surface on the retaining spring;
   wherein the retaining spring has a second angled surface arranged in contact with a corresponding angled surface on the radially outer portion of the back plate; and
   wherein the angled surfaces are arranged at an acute angle relative to a plane parallel to the brake disc rotary axis, which angle is converging with the rotary axis of the brake disc in the direction of the brake disc.

2. The brake pad retainer system of claim 1, wherein the angled surfaces of the radially outer portion of the back plate, the retaining spring and the retainer bracket are arranged at the same angle.

3. The brake pad retainer system of claim 1, wherein the angle is selected between 1° and 10°.

4. The brake pad retainer system of claim 1, wherein each angled surface comprises a flat surface.

5. The brake pad retainer system of claim 1, wherein the retaining spring has a first and a second opening along its longitudinal extension and is mounted on corresponding first and second projections extending from the radially outer portion of the back plate.

6. The brake pad retainer system of claim 1, wherein the retaining spring and the back plate comprise cooperating locating means to orientate the retaining spring relative to the back plate.

7. The brake pad retainer system of claim 6, wherein the locating means comprises combination wide and narrow slots positioned along the retaining spring arranged to cooperate with matching projections on the radially outer portion of the back plate.

8. The brake pad retainer system of claim 6, wherein the locating means comprises different widths of the first and the second openings in the retaining spring and corresponding different thicknesses of the first and second projections on the back plate.

9. The brake pad retainer system of claim 6, wherein the locating means comprises an asymmetric location of the first and the second openings and the first and second projections along the radially outer portion of the back plate.

10. A vehicle, wherein the vehicle comprises the brake pad retainer system of claim 1.

* * * * *